No. 756,841. PATENTED APR. 12, 1904.
C. T. ELLISTON.
DRAFT EVENER.
APPLICATION FILED AUG. 22, 1903.
NO MODEL.

Witnesses
M. D. Blondell
Clarence Shaw

Inventor
C. T. Elliston,
By O'Meara & Brock
Attorneys

No. 756,841. Patented April 12, 1904.

UNITED STATES PATENT OFFICE.

CHARLES T. ELLISTON, OF CLINTON, MISSOURI.

DRAFT-EVENER.

SPECIFICATION forming part of Letters Patent No. 756,841, dated April 12, 1904.

Application filed August 22, 1903. Serial No. 170,433. (No model.)

*To all whom it may concern:*

Be it known that I, CHARLES T. ELLISTON, a citizen of the United States, residing at Clinton, in the county of Henry and State of Missouri, have invented a new and useful Draft-Evener, of which the following is a specification.

My invention is a draft evener or equalizer; and the object of my invention is a draft appliance which is adapted for use with either three or four horses, the equalizer-bar for the fourth horse being detachable.

My invention consists of the novel features of construction and combination of parts hereinafter shown and described, particularly pointed out in the claims, and shown in the accompanying drawings, in which—

Figure 1:
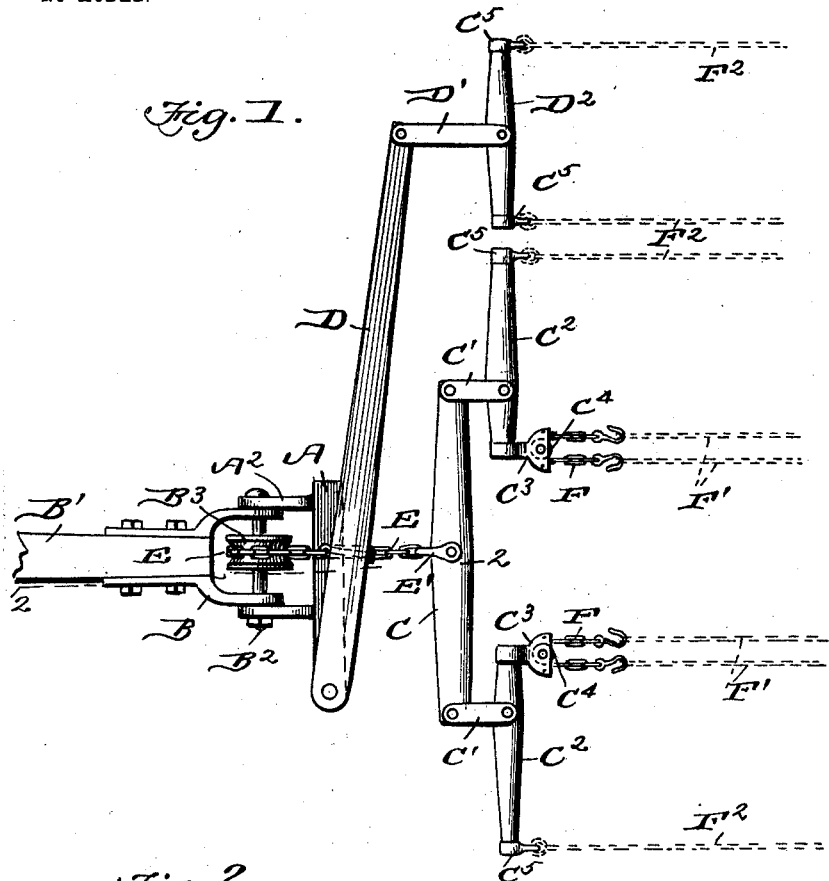
Figure 2:
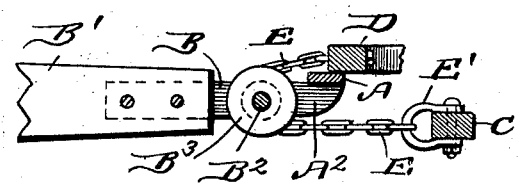
Figure 3:
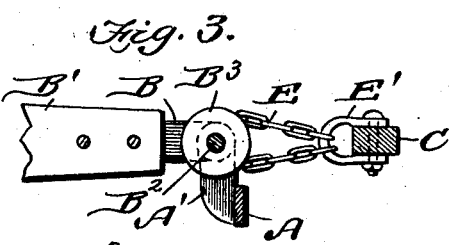
Figure 4:
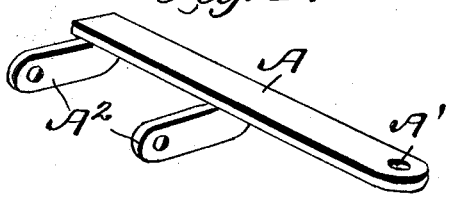
Figure 5:
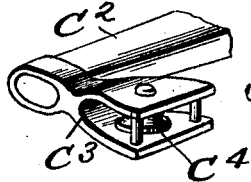

Figure 1 is a plan view of my device. Fig. 2 is a section on the line 2 2 of Fig. 3. Fig. 3 is a similar section showing arrangement of the parts when three horses are used. Fig. 4 is a perspective view of the bar attached to the beam-clevis. Fig. 5 is a perspective view of one end of a whiffletree.

In constructing my draft appliance I employ a bar A, having the perforation A' adjacent one end. This bar has two parallel rearwardly-extending arms $A^2$, one extending rearwardly from about the center of the bar A and the other from a point adjacent the non-perforated end. Both of these arms are perforated adjacent their rear ends and are adapted to fit over a clevis B, carried at the outer end of the tongue or beam B'. A suitable bolt $B^2$ passes through the clevis and through the perforations of the arms $A^2$, pivotally securing them to the clevis. A pulley $B^3$ is rotatably secured on the bolt $B^2$.

The doubletree C is pivoted through the medium of the clevis C' to the whiffletrees $C^2$. Each clevis C' is pivoted to a whiffletree at a distance from its inner end equal to approximately one-third of the length of the whiffletree, leaving two-thirds of its length extending laterally beyond the doubletree. On the inner end of each whiffletree is secured a bracket $C^3$, in which is horizontally and rotatably mounted a pulley $C^4$. The usual metal ring and eye $C^5$ is secured to the outer ends of these trees. A longer bar D is detachably pivoted in any well-known manner at one end to the perforated end of the bar A, the opposite end of the bar D extending a considerable distance beyond the non-perforate end of the bar A, and the bar D being adapted to swing over and parallel to the bar A. A link D' is pivoted at its rear end to the free swinging end of the bar D and at its forward end to the middle portion of a whiffletree $D^2$. This tree is also equipped with the rings and eyes $C^5$. A chain E is attached at one end to the bar D in vertical alinement with the tongue B and passed rearwardly and downwardly over the pulley $B^3$, and then forwardly, its forward end being secured to a clevis E', which is pivoted to the doubletree midway its ends. Chains F are passed around the pulleys $C^4$, and to each end of said chains are attached draft-chains F'. Draft-chains $F^2$ are also attached to the eyes of the rings $C^5$. When the draft is slackened, the arms $A^2$ will depend perpendicularly from the clevis B; but when draft is applied the arms will be raised and the bar A will be parallel to and in the horizontal plane of the bolt $B^2$. When the horse attached to the whiffletree $D^2$ draws the bar D forward, as shown in Fig. 1, the doubletree C will be drawn back toward the tongue by action of the chain E. Should the bar D be permitted to swing so that its free end will be to the rear of the bar A, the chain E will run out over the pulley and the doubletree C will be drawn forward, working at a greater distance from the tongue. When but three horses are to be used, the bar D is detached, and both ends of the chain E, as shown in Fig. 3, are attached to the clevis E'.

Having thus fully described my invention, what I claim as new, and desire to secure by Letters Patent, is—

1. A device of the kind described comprising in combination with a draft-beam having a clevis at its outer end, a pulley carried by said clevis, a doubletree having a forwardly-extending clevis pivotally secured at each end of the doubletree, a rearwardly-extending clevis pivoted intermediate the doubletree, whiffletrees, each pivotally secured to the forwardly-extending clevis at a point nearer the inner end of the whiffletree than the outer end, brackets carried on the inner ends of said whiffletrees, pulleys arranged horizontally in said brackets and a chain passing over the pulley carried by the beam-clevis and connected to the rearwardly-extending clevis of the doubletree.

2. An appliance of the kind described comprising a draft-beam, a pulley carried at its outer end, a bar having rearwardly-extending arms, said arms being pivotally connected to the draft-beam, a long bar pivoted to the first-mentioned bar and adapted to swing over and parallel to same, a whiffletree pivotally connected to the free end of the long bar, a doubletree, whiffletrees pivotally connected at one end to the long bar in alinement with the pulley and passed over the latter and connected at its opposite end to the doubletree.

3. The combination with a draft-beam, of a clevis on the outer end of the beam, a short bar, parallel perforated arms extending rearwardly from the central portion and one end portion of the bar, said arms fitting over the clevis, a bolt passing through the clevis and arms and pivoting the arms to the clevis, a pulley on said bolt, a long bar pivoted at one end to the end of the short bar opposite the arms, said long bar being adapted to rest above and over the short bar, a whiffletree, a link pivoted at one end to the free end of the long bar and at the opposite end to the whiffletree intermediate its ends, a doubletree, whiffletrees pivotally connected adjacent their inner ends to the ends of the doubletree, and a chain connected at one end to the long bar in alinement with the draft-beam, and carried over the pulley and connected at the opposite end to the doubletree.

4. In a device of the kind described, the combination with a draft-beam carrying a pulley at its outer end, of a doubletree, whiffletrees pivotally connected at points adjacent their inner ends to the ends of the doubletree, pulleys carried by the inner ends of the whiffletrees, a horizontal bar pivotally connected to and swinging transversely to the draft-beam, a chain attached at one end to the doubletree and at the opposite end to the swinging bar, said chain passing over the pulley carried by the beam, and a whiffletree pivotally connected to the free end of the swinging bar.

CHARLES T. ELLISTON.

Witnesses:
W. E. WILBUR,
F. S. GRAY.